No. 794,781. PATENTED JULY 18, 1905.
A. W. CLAUSEN.
NUT.
APPLICATION FILED JULY 12, 1904.

Witnesses
F. A. Parron
M. A. Schmidt

Arthur W. Clausen, Inventor
by
Milo B. Stevens & Co. Attorneys

No. 794,781. Patented July 18, 1905.

UNITED STATES PATENT OFFICE.

ARTHUR W. CLAUSEN, OF CHICAGO, ILLINOIS.

NUT.

SPECIFICATION forming part of Letters Patent No. 794,781, dated July 18, 1905.

Application filed July 12, 1904. Serial No. 216,290.

*To all whom it may concern:*

Be it known that I, ARTHUR W. CLAUSEN, a citizen of the United States, residing at Chicago, in the county of Cook and State of Illinois, have invented new and useful Improvements in Nuts, of which the following is a specification.

My invention relates to a nut for threadless bolts, and has for its object to provide a nut which can be quickly applied and removed.

A further object is to provide efficient means for locking the bolt on the nut to prevent separation thereof.

With these objects in view the invention consists in certain novel features of construction hereinafter described and claimed, reference being had to the drawings hereto annexed, in which—

Figure 1:
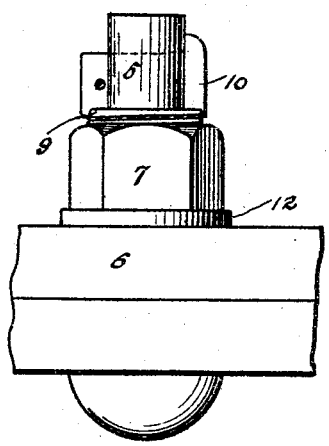
Figure 2:
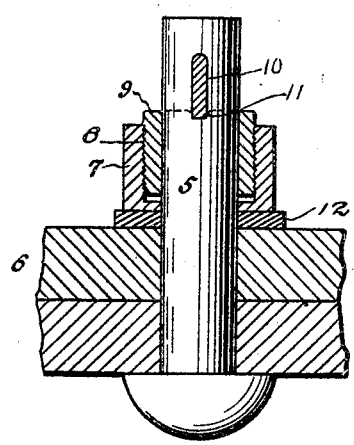
Figure 3:
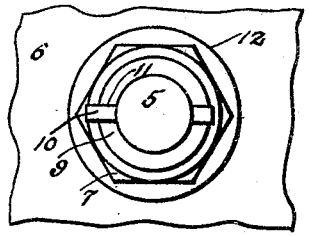

Figure 1 is a side elevation showing the nut applied and locked on the bolt. Fig. 2 is a sectional view, and Fig. 3 is a plan view.

Referring specifically to the drawings, 5 denotes a bolt which passes through the parts 6 to be fastened together. The nut 7 fits loosely over the end of the bolt, being provided with a threaded bore 8, said bore having a diameter somewhat greater than that of the bolt, whereby an annular space is formed around the bolt to receive the sleeve 9. This sleeve fits snugly on the bolt and is threaded on the outside to screw into the nut 7, as clearly shown in Fig. 2. Above the sleeve 9 a transverse slot is made in the bolt to receive a key 10, which also fits in notches 11 made in the outer end of the sleeve 9. The notches 11 also afford convenient means for screwing the sleeve into and out of the nut when off the bolt. When it is desired to tighten the bolt in the work, a wrench is applied to the nut 7 and it is turned in or down, which has the effect of lifting or forcing the sleeve 9 outwardly against the key 10, which accordingly strains the bolt, and the key fitting in the notches 11 prevents the sleeve from turning. The key securely locks the nut and sleeve on the bolt and prevents separation of the parts. When it is desired to remove the nut and sleeve, it is necessary only to knock out the key. In use a washer 12 may be placed under the nut, as shown.

What I claim as new, and desire to secure by Letters Patent, is—

The combination with a bolt of regular outline, of a nut fitting loosely thereon and provided with a threaded bore, a sleeve on the bolt and screwed into the nut, said sleeve having notches across its end, arranged to receive a tool whereby the sleeve may be unscrewed from the nut, and a key extending through the bolt and fitting in the notches, preventing turning of the sleeve with respect to the bolt.

In testimony whereof I have signed my name to this specification in the presence of two subscribing witnesses.

ARTHUR W. CLAUSEN.

Witnesses:
 ELSA PROSCHE,
 H. G. BATCHELOR.